US009002044B2

(12) United States Patent
Dinescu et al.

(10) Patent No.: US 9,002,044 B2
(45) Date of Patent: Apr. 7, 2015

(54) SYNCHRONIZING WIRELESS EARPHONES

(75) Inventors: Mihail C. Dinescu, Schaumburg, IL (US); Joseph Mazza, Warrenville, IL (US); Adam Kujanski, Bartlett, IL (US); Brian Gaza, Naperville, IL (US); Michael Sagan, Marshall, WI (US)

(73) Assignee: Koss Corporation, Milwaukee, WI (US)

( * ) Notice: Subject to any disclaimer, the term of this patent is extended or adjusted under 35 U.S.C. 154(b) by 310 days.

(21) Appl. No.: 13/394,848

(22) PCT Filed: Sep. 10, 2010

(86) PCT No.: PCT/US2010/048337

§ 371 (c)(1),
(2), (4) Date: May 10, 2012

(87) PCT Pub. No.: WO2011/031910

PCT Pub. Date: Mar. 17, 2011

(65) Prior Publication Data

US 2012/0230510 A1 Sep. 13, 2012

Related U.S. Application Data

(60) Provisional application No. 61/276,266, filed on Sep. 10, 2009.

(51) Int. Cl.

| | |
|---|---|
| ***H04R 5/02*** | (2006.01) |
| ***H04B 5/00*** | (2006.01) |
| ***H04R 5/033*** | (2006.01) |
| *H04R 1/10* | (2006.01) |

(52) U.S. Cl.

CPC .............. *H04R 5/033* (2013.01); *H04R 1/1016* (2013.01); *H04R 1/105* (2013.01); *H04R 2205/022* (2013.01); *H04R 2420/07* (2013.01)

(58) Field of Classification Search

CPC .... H04R 5/033; H04R 25/552; H04R 25/554; H04R 2420/07; H04R 2227/005; H04R 2201/103; H04B 5/0006; H04L 65/60

USPC ........................ 381/77, 79–80, 309, 311, 315

See application file for complete search history.

(56) References Cited

U.S. PATENT DOCUMENTS

| | | | | |
|---|---|---|---|---|
| 7,277,692 | B1 * | 10/2007 | Jones et al. | 455/412.1 |
| 2006/0013208 | A1 * | 1/2006 | Rietschel et al. | 370/389 |
| 2007/0226530 | A1 * | 9/2007 | Celinski et al. | 713/500 |
| 2008/0226094 | A1 * | 9/2008 | Rutschman | 381/79 |

(Continued)

*Primary Examiner* — Matthew Eason

(74) *Attorney, Agent, or Firm* — K&L Gates LLP

(57) ABSTRACT

Electroacoustical speaker devices that synchronously play audio received from a source. In one embodiment, one speaker acts as the master and the other speaker acts as the slave. The master speaker receives digital audio data from a source and, in addition to playing the digital audio received from the source, the master speaker retransmits the digital audio to the slave speaker. The master speaker additionally sends synchronization data to the slave speaker, such as data that indicates the buffer status or playback position of the master speaker. The slave speaker utilizes the synchronization data from the master speaker to adjust, for example, its buffer status or playback position, so that the two speakers play the audio synchronously (e.g., within thirty milliseconds). In one embodiment, the master speaker uses a connection-oriented protocol, such as TCP/IP, to transmit buffered audio data to the slave speaker and uses a connectionless protocol, such as UDP or ICMP, for the synchronization data. In addition, the speakers may transition roles as master and slave.

36 Claims, 4 Drawing Sheets

(56) References Cited

U.S. PATENT DOCUMENTS

2009/0052667 A1* 2/2009 Iwamura ........................ 380/200
2009/0083372 A1* 3/2009 Teppler .......................... 709/203
2009/0106357 A1* 4/2009 Igelman et al. ............... 709/203
2009/0154739 A1* 6/2009 Zellner ........................... 381/311
2012/0058727 A1* 3/2012 Cook et al. ..................... 455/41.3

* cited by examiner

SYNCHRONIZING WIRELESS EARPHONES

PRIORITY CLAIM

The present application is the U.S. National Phase of International Patent Application PCT/US10/48337, filed Sep. 10, 2010, and claims the benefit of said PCT International Patent Application pursuant to 35 U.S.C. §365, said PCT International Patent Application claiming the benefit of U.S. provisional patent application Ser. No. 61/276,266, filed Sep. 10, 2009.

BACKGROUND

Wireless earphones or headsets are known. For example, PCT application PCT/US09/39754, which is incorporated herein by reference in its entirety, discloses a wireless earphone that receives and plays streaming digital audio. When a user wears wireless earphones in both of his/her ears, the playing of the digital audio stream preferably is synchronized to reduce or eliminate the Haas effect. The Haas effect is a psychoacoustic effect related to a group of auditory phenomena known as the Precedence Effect or law of the first wave front. These effects, in conjunction with sensory reaction(s) to other physical differences (such as phase differences) between perceived sounds, are responsible for the ability of listeners with two ears to localize accurately sounds coming from around them. When two identical sounds (i.e., identical sound waves of the same perceived intensity) originate from two sources at different distances from the listener, the sound created at the closest location is heard (arrives) first. To the listener, this creates the impression that the sound comes from that location alone due to a phenomenon that might be described as "involuntary sensory inhibition" in that one's perception of later arrivals is suppressed. The Haas effect occurs when arrival times of the sounds differ by more than 30 to 40 milliseconds. As the arrival time (in respect to the listener) of the two audio sources increasingly differ beyond forty (40) milliseconds, the sounds will begin to be heard as distinct. This is not a desirous effect when listening to audio in a pair of earphones.

SUMMARY

In one general aspect, the present invention is directed to electroacoustical speaker devices, such as earphones or other types of loudspeakers, that synchronously play audio received from a source. In one embodiment, one speaker (e.g., earphone) acts as the master and the other speaker (e.g., earphone) acts as the slave. The master speaker receives digital audio data from a source and, in addition to playing the digital audio received from the source, the master speaker retransmits the digital audio to the slave speaker. The master speaker additionally sends synchronization data to the slave speaker, such as data that indicates the buffer status or playback position of the master speaker. The slave speaker utilizes the synchronization data from the master speaker to adjust, for example, its buffer status or playback position, so that the two speakers play the audio synchronously (e.g., within thirty milliseconds). In one embodiment, the master speaker uses a connection-oriented protocol, such as TCP/IP, to transmit buffered audio data to the slave speaker and uses a connectionless protocol, such as UDP, ICMP, or any other fast, low overhead protocol, for the synchronization data. In addition, the speakers may transition roles as master and slave.

FIGURES

Various embodiments of the present invention are described herein by way of example in connection with the following figures, wherein.

DESCRIPTION

Various embodiments of the present invention are directed to electroacoustical speaker devices that exchange synchronization data so that the speaker devices synchronously play audio received from a source. Various embodiments of the present invention are described herein with reference to wireless earphones as the speaker devices, although it should be recognized that the invention is not so limited and that different types of speakers besides earphones could be used in other embodiments. In addition, the earphones (or other types of speakers) do not need to be wireless.

Figure 1:
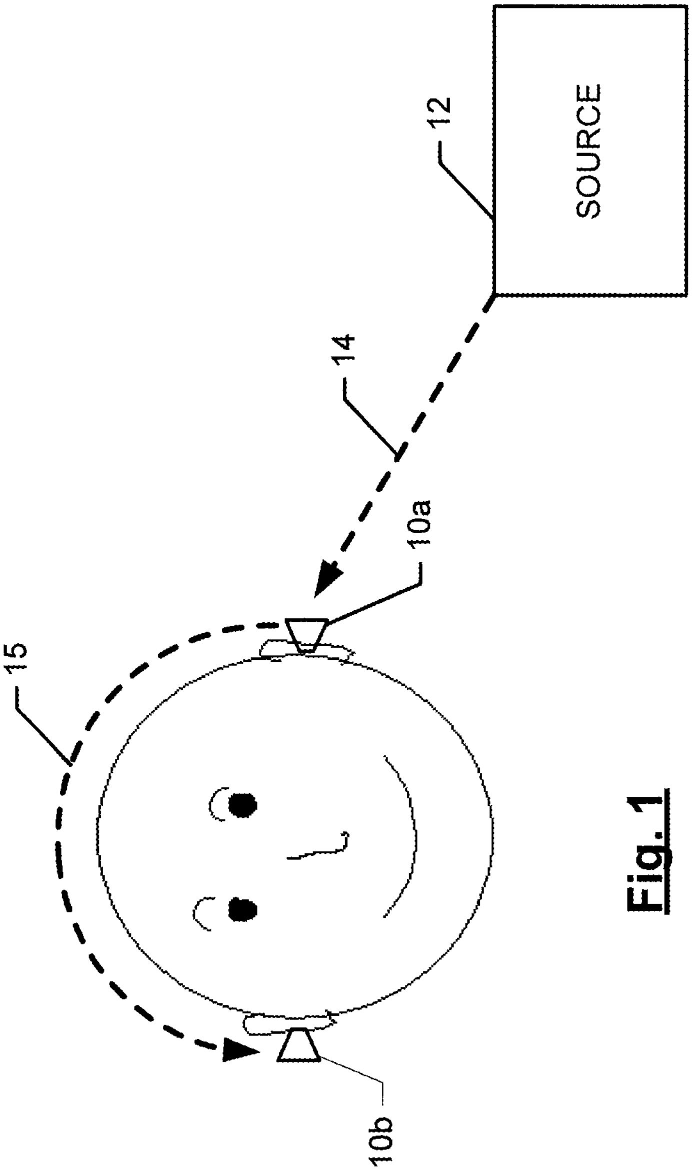
FIG. 1 illustrates a pair of wireless earphone according to various embodiments of the present invention.

FIG. 1 is a diagram of a user wearing two wireless earphones 10*a*, 10*b*—one in each ear. As described herein, the earphones 10*a*, 10*b* may receive and synchronously play digital audio data, such as streaming or non-streaming digital audio. In various embodiments of the present invention, at any given time during functional operation, one of the earphones may act as a master and the other may act as a slave. In such embodiments, the master earphone, say earphone 10*a* in this description, receives digital audio data from a digital audio source 12 via a communication link 14. The communication link 14 may be a wireless or wired communication link. The master earphone 10*a* then wirelessly transmits the received streaming audio to the slave earphone 10*b* via a wireless communication link 15. The two earphones 10*a*, 10*b* play the audio nearly synchronously for the user, i.e., preferably with forty (40) milliseconds or less difference in the arrival times, and more preferably with thirty (30) milliseconds or less.

In various embodiments, as described in PCT application PCT/US09/39754, which is incorporated herein by reference in its entirety, the source 12 may be a digital audio player (DAP), such as an mp3 player or an iPod, or any other suitable source of digital audio, such as a laptop or a personal computer, that stores and/or plays digital audio files, and that communicates with the master earphone 10*a* via the data communication link 14. For embodiments where the data communication link 14 is wireless, any suitable wireless communication protocol may be used. Preferably, the wireless link 14 is a Wi-Fi (e.g., IEEE 802.11a/b/g/n) communication link, although in other embodiments different wireless communication protocols may be used, such as WiMAX (IEEE 802.16), Bluetooth, Zigbee, and UWB. For embodiments where the data communication link 14 is a wired link, any suitable communication protocol may be used, such as Ethernet. Also, the source 12 may be a remote server, such as a (streaming or non-streaming) digital audio content server connected on the Internet, that connects to the master earphone 10*a*, such as via an access point of a wireless network or via a wired connection. For embodiments where the data communication link 14 is wireless, the wireless communication link 15 between the master earphone 10*a* and the slave earphone 10*b* may use the same network protocol for retransmitting the audio from the music earphone 10*a* to the slave earphone 10*b* as the wireless communication link 14.

In one embodiment, during the course of operation, the earphones may switch roles as master and slave. That is, for example, the earphones 10*a*, 10*b* may be programmed so that if at any given time earphone 10*a* is acting as the master and earphone 10*b* is acting as the slave, at a subsequent time earphone 10*a* may switch to being the slave and earphone 10*b* may assume the role of master. Because the transmitting (e.g., master) earphone typically consumes more power than the slave earphone, switching roles may have the effect of evening the power source (e.g., battery) consumption of the two earphones 10*a*, 10*b*.

Figure 2B:
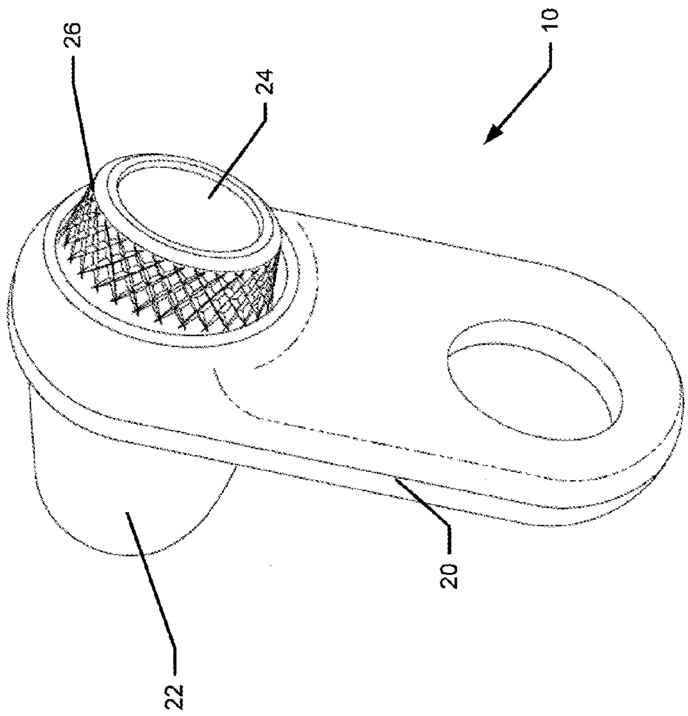
FIGS. 2A-2D illustrate various embodiments of a wireless earphone according to various embodiments of the present invention.
Figure 2A:
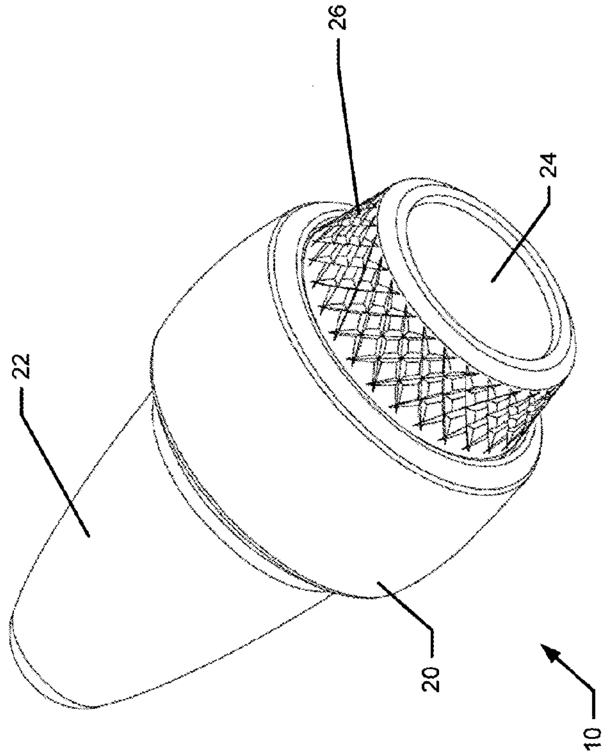

Before describing in more detail how the synchronization of the audio playback may be achieved, some details regarding exemplary earphones 10*a*, 10*b* according to various embodiments of the present invention are first described. FIGS. 2A and 2B show two different embodiments of the earphones 10. The examples shown in FIGS. 2A and 2B are not limiting and other configurations are within the scope of the present invention. As shown in FIGS. 2A and 2B, the earphone 10 may comprise a body 20. The body 20 may comprise an ear canal portion 22 that is inserted in the ear canal of the user of the earphone. In various embodiments, the body 20 also may comprise an exterior portion 24 that is not inserted into user's ear canal. The exterior portion 24 may comprise a knob 26 or some other user control (such as a dial, a pressure-activated switch, lever, etc.) for adjusting the shape of the ear canal portion 22. That is, in various embodiments, activation (e.g. rotation) of the knob 26 may cause the ear canal portion 22 to change shape so as to, for example, radially expand to fit snugly against all sides of the user's ear canal. Further details regarding such a shape-changing earbud earphone are described in application PCT/US08/88656, filed 31 Dec. 2008, entitled "Adjustable Shape Earphone," which is incorporated herein by reference in its entirety. The earphone 10 also may comprise a transceiver circuit housed within the body 20. The transceiver circuit, described further below, may transmit and receive the wireless signals. The transceiver circuit may be housed in the exterior portion 24 of the earphone 10 and/or in the ear canal portion 22.

Although the example earphones 10 shown in FIGS. 2A and 2B include a knob 26 for adjusting the shape of the ear canal portion 22, the present invention is not so limited, and in other embodiments, different means besides a knob 26 may be used to adjust the ear canal portion 22. In addition, in other embodiments, the earphone 10 may not comprise a shape-changing ear canal portion 22.

Figure 2D:
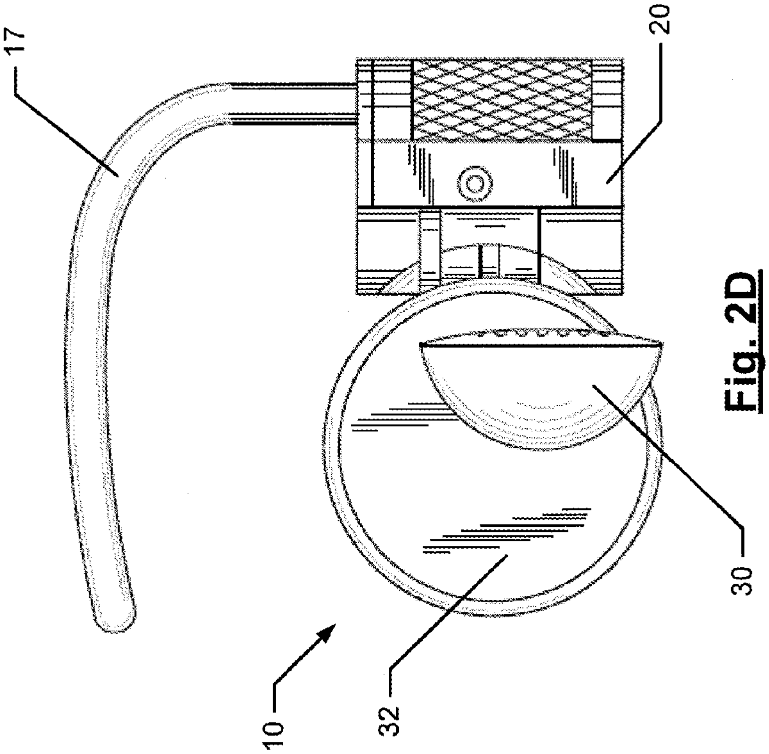
Figure 2C:
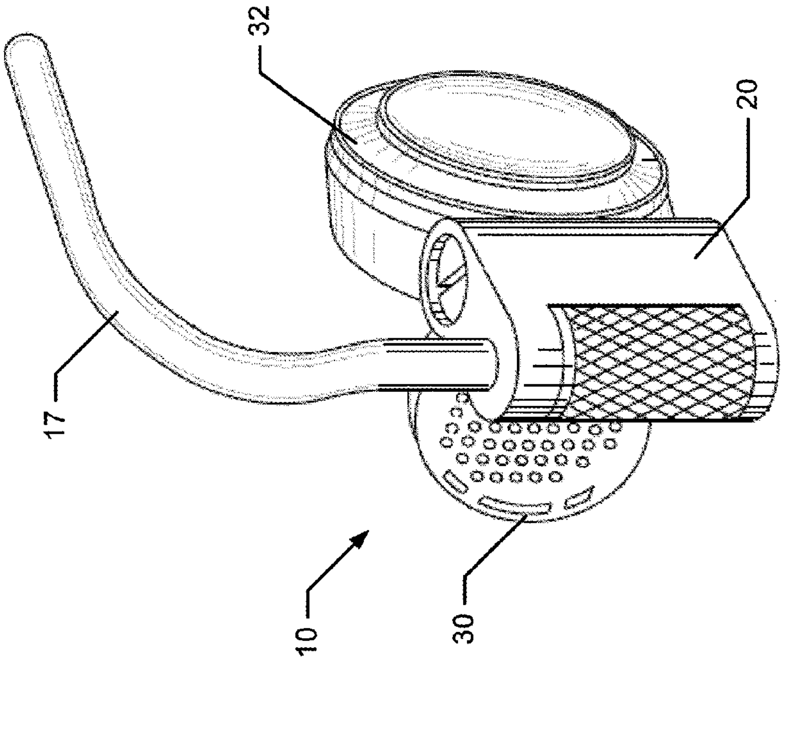

In other embodiments, as shown in the illustrated embodiment of FIGS. 2C and 2D, the earphone 10 may comprise a hanger bar 17 that allows the earphone 10 to clip to, or hang on, the user's ear. FIG. 2C is a perspective view of the earphone and FIG. 2D is a side view according to one embodiment. As shown in the illustrated embodiment, the earphone 10 may comprise dual speaker elements 30, 32. One of the speaker elements (the smaller one) 30 is sized to fit into the cavum concha of the listener's ear and the other element (the larger one) 32 is not. The listener may use the hanger bar to position the earphone on the listener's ear. In that connection, the hanger bar may comprise a horizontal section that rests upon the upper external curvature of the listener's ear behind the upper portion of the auricula (or pinna). The earphone may comprise a knurled knob that allows the user to adjust finely the distance between the horizontal section of the hanger bar and the speaker elements, thereby providing, in such embodiments, another measure of adjustability for the user. More details regarding such a dual element, adjustable earphone may be found in PCT patent application PCT/US09/44340, which is incorporated herein by reference in its entirety.

Figure 3:
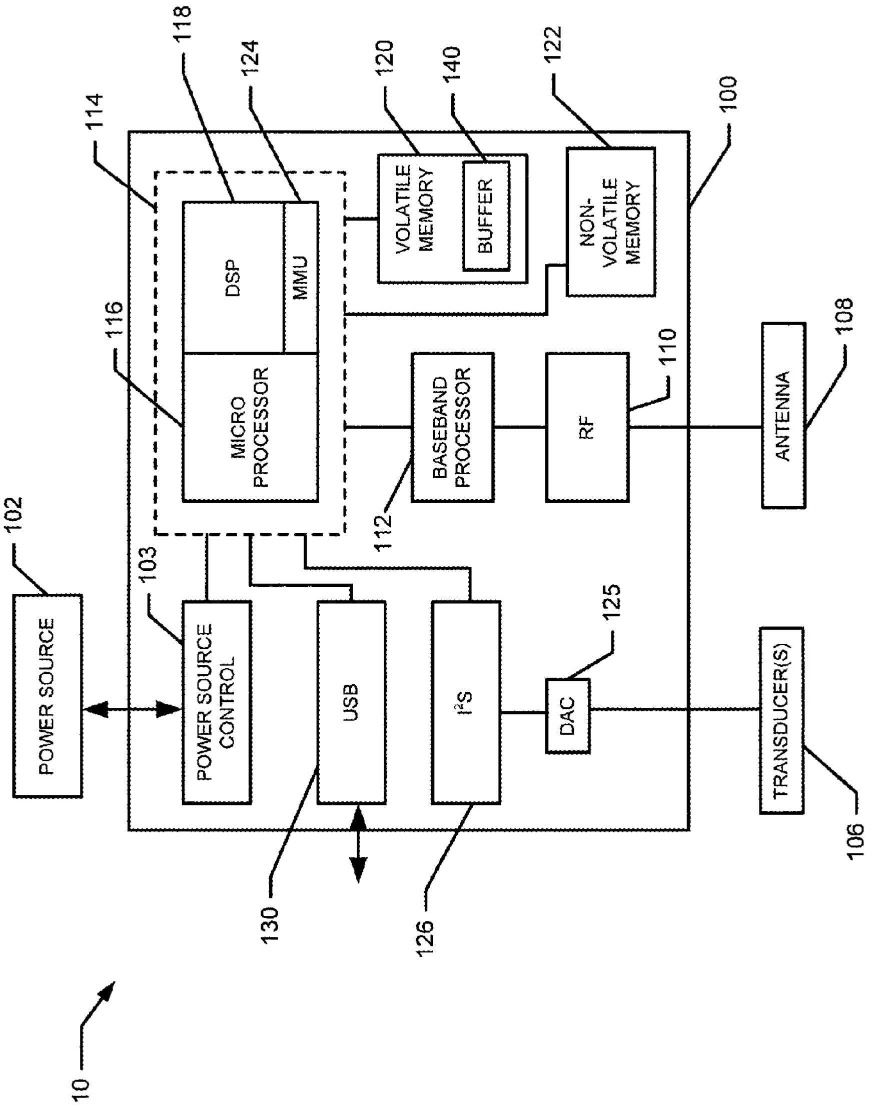
FIG. 3 is a block diagram of a wireless earphone according to various embodiments of the present invention.

FIG. 3 is a block diagram of one of the earphones 10*a*, 10*b* according to various embodiment of the present invention. Because, in various embodiments, the earphones 10*a*, 10*b* are programmed to have the capability to switch roles as master and slave, the components of the earphones 10*a*, 10*b* may be the same. In the illustrated embodiment, the earphone 10 comprises a transceiver circuit 100 and related peripheral components. The peripheral components of the earphone 10 may comprise a power source 102, one or more acoustic transducers 106 (e.g., speakers), and one or more antennas 108. The transceiver circuit 100 and some of the peripheral components (such as the power source 102 and the acoustic transducers 106) may be housed within the body 12 of the earphone 10 (see FIGS. 2A-2D). In other embodiments, the earphone may comprise additional peripheral components, such as a microphone, for example.

In various embodiments, the transceiver circuit 100 may be implemented as a single integrated circuit (IC), such as a system-on-chip (SoC), which is conducive to miniaturizing the components of the earphone 10, which is advantageous if the earphone 10 is to be relatively small in size, such as an in-ear earphone (see FIGS. 2A-2B for example). In alternative embodiments, however, the components of the transceiver circuit 100 could be realized with two or more discrete ICs, such as separate ICs for the processors, memory, and Wi-Fi module, for example.

The power source 102 may comprise, for example, a rechargeable or non-rechargeable battery (or batteries). In other embodiments, the power source 102 may comprise one or more ultracapacitors (sometimes referred to as supercapacitors) that are charged by a primary power source. In embodiments where the power source 102 comprises a rechargeable battery cell or an ultracapacitor, the battery cell or ultracapacitor, as the case may be, may be charged for use, for example, when the earphone 10 is connected to a docking station, in either a wired or wireless connection. The docking station may be connected to or part of a computer device, such as a laptop computer or PC. In addition to charging the rechargeable power source 102, the docking station may facilitate downloading of data to and/or from the earphone 10. In other embodiments, the power source 102 may comprise capacitors passively charged with RF radiation, such as described in U.S. Pat. No. 7,027,311. The power source 102 may be coupled to a power source control module 103 of the transceiver circuit 100 that controls and monitors the power source 102.

The acoustic transducer(s) 106 may be the speaker element(s) for conveying the sound to the user of the earphone 10. According to various embodiments, the earphone 10 may comprise one or more acoustic transducers 106. For embodiments having more than one transducer, one transducer may be larger than the other transducer, and a crossover circuit (not shown) may transmit the higher frequencies to the smaller transducer and may transmit the lower frequencies to the larger transducer. More details regarding dual element earphones are provided in U.S. Pat. No. 5,333,206, assigned to Koss Corporation, which is incorporated herein by reference in its entirety.

In the case of the master earphone, the antenna 108 may receive the wireless signals from the source 12 via the wireless communication link 14. The antenna 108 may also radiate the signals to the slave earphone 106 via the wireless communication link 15. In other embodiments, separate antennas may be used.

For embodiments where the communication links 14, 15 are Wi-Fi links, a Wi-Fi module 110 of the transceiver circuit 100 in communication with the antenna 108 may, among other things, modulate and demodulate the signals transmitted from and received by the antenna 108. The Wi-Fi module 110 communicates with a baseband processor 112, which performs other functions necessary for the earphone 10 to communicate using the Wi-Fi (or other communication) protocol.

The baseband processor 112 may be in communication with a processor unit 114, which may comprise a microprocessor 116 and a digital signal processor (DSP) 118. The microprocessor 116 may control the various components of the transceiver circuit 100. The DSP 114 may, for example, perform various sound quality enhancements to the digital audio signal received by the baseband processor 112, including noise cancellation and sound equalization. The processor unit 114 may be in communication with a volatile memory unit 120 and a non-volatile memory unit 122. A memory management unit 124 may control the processor unit's access to the memory units 120, 122. The volatile memory 120 may comprise, for example, a random access memory (RAM) circuit. The non-volatile memory unit 122 may comprise a read only memory (ROM) and/or flash memory circuits. The memory units 120, 122 may store firmware that is executed by the processor unit 114. Execution of the firmware by the processor unit 114 may provide various functionalities for the earphone 10, including those described herein, including synchronizing the playback of the audio between the pair of earphones.

A digital-to-analog converter (DAC) 125 may convert the digital audio signals from the processor unit 114 to analog form for coupling to the acoustic transducer(s) 106. An $I^2S$ interface 126 or other suitable serial or parallel bus interface may provide the interface between the processor unit 114 and the DAC 125.

The transceiver circuit 100 also may comprise a USB or other suitable interface 130 that allows the earphone 10 to be connected to an external device via a USB cable or other suitable link.

The earphone 10*a* acting as the master may buffer the incoming digital audio data in a buffer 140 before sending it to the transducer(s) 106 for playing. The buffer 140 may be part of the volatile memory unit 120 as shown in FIG. 3, or the buffer 140 could be separate. In various embodiments, data, in bytes, for several second's worth of audio, such as three seconds worth or some other amount, may be buffered in the buffer 140, which may be a circular buffer. The master earphone 10*a* also forwards the incoming digital audio to the slave earphone 10*b* via communication link 15. The data to be forwarded to the slave earphone 10*b* may be transmitted from a transmit buffer, that may be the same as or different from the buffer 140.

In addition, the master earphone 10*a* may send to the slave earphone 10*b* synchronization data, such as the current byte position of the master earphone 10*a* buffer 140, that allows the slave earphone 10*b* to synchronize its playing of the digital audio with the master earphone's playing of the digital audio. The synchronization data may comprise data indicative of the buffer status or playback position of the buffer 140 of the master earphone 10*a*. The buffer status data may include, for example, data indicative of indices for the read and/or write counts of the buffer.

In one embodiment, the master earphone 10*a* transmits the buffered audio data using a connection-oriented protocol and uses a connectionless protocol for the synchronization data. For example, the master earphone 10*a* may transmit data packets for the buffered audio data to the slave earphone 10*b* using the TCP/IP protocol. The master earphone 10*a* may transmit data packets for the synchronization data to the slave earphone 10*b* using the UDP protocol. The master earphone 10*a* may send the UDP data packets periodically, such as every 0.5, 1, 3, 5, or 10 seconds, or some other period. The processor unit 114 of the master earphone 10*a* may be programmed to send the audio TCP/IP packets and UDP synchronization data packets to the slave earphone 10*b* with code or firmware stored in a memory unit of the master earphone 10*a*, such as the non-volatile memory unit 122.

When acting as the slave, the earphone 10 may be programmed, based on code or firmware stored in the non-volatile memory unit 122 of the slave earphone 10*b*, to store the audio TCP/IP packets received from the master earphone 10*a* in the buffer 140 of the slave earphone 10*b*. When the slave earphone 10*b* receives a UDP synchronization data from the master earphone 10*a*, the slave earphone 10*b* may update or adjust its buffer status, or playback position in the buffer 140, to match the master earphone's buffer status. After adjusting its buffer position, the slave earphone 10*b* plays the buffered audio stored in the buffer 140 using the adjusted buffer position.

Because the transmit times of the UDP buffer status packets from the master earphone 10*a* to the slave earphone 10*b* are not always uniform, in various embodiments, the slave earphone 10*b* may, by executing code or firmware stored in the non-volatile memory unit 122, track the time intervals between receipt of the UDP buffer status packets from the master earphone 10*a*. The history (or log) of time intervals may be stored in the volatile memory unit 120 of the slave earphone 10*b*, and the processor unit 114 may compute and save ongoing statistics about the time intervals, such as the absolute and rolling average time intervals, absolute and rolling median time intervals, absolute and rolling standard deviations, etc.

The slave earphone 10*b* may use the time interval statistics in determining how much to adjust its buffer status. For example, if a particular UDP buffer status packet from the master earphone 10*a* took significantly longer to receive than the average time interval between UDP buffer status packets, the slave earphone 10*b* may adjust its buffer status less than it would have if the UDP buffer status packet had been received in close to the average time interval. Alternatively, the slave earphone 10*b* may delete the synchronization data from the master 10*a* if it is significantly different from the scheduled, or expected, interval.

In another embodiment, in addition to tracking the time interval statistics, the slave earphone 10*b* may track and log the adjustment it made to its buffer each time. The slave earphone 10*b* may then estimate the amount of adjustment it will be required to make based on the next-to-be-received UDP buffer status packet from the master earphone 10*a*, and make adjustments to its buffer position over the time period before receipt of the next UDP buffer status packet to reduce the amount of adjustment needed when the next UDP buffer status packet is received from the master earphone 10*a*. For example, if over a time period of operation the slave earphone 10*b* needs to continually adjust its position in its buffer 140 by approximately N units (e.g., data bytes) each time the slave earphone 10*b* receives a UDP buffer status packet from the master earphone 10*a*, the slave earphone 10*b* may calculate that over the average x seconds between UDP buffer status packets, it could adjust its buffer position by N/x positions per second so that when the next UDP buffer status packet from the master earphone 10*a* is received, the amount of adjustment needed to be made by the slave earphone 10*b* to its buffer position is reduced.

Besides UDP, any suitable low overhead protocol can be used to transmit the synchronization data from the master to the slave. For example, in another embodiment, instead of transmitting UDP buffer status packets to the slave earphone 10*b*, the earphones 10 may exchange ping messages, such as Internet Control Message Protocol (ICMP) messages. The ICMP messages may be, for example, "Echo request" and "Echo reply" messages. For example, the master earphone 10*a* may transmit an "Echo request" ICMP message and the slave earphone 10*b* may in return transmit an "Echo reply" ICMP message to the master earphone 10*a*. The slave earphone 10*b* may adjust its buffer position based on the ICMP messages to synchronize with the master. In another embodiment, the earphones may compute adjustments to their internal clocks based on, for the master, the time difference between when it transmitted its message and when it received the reply from the slave. The slave may adjust its internal clock based on the time period between when it transmitted its reply and the next request received from the master.

As mentioned above, the master and slave earphones may transition roles as master and slave during operation. In one embodiment, one of the earphones is programmed to start as the master when powered on, and the other earphone, acting as the slave, looks for the address, such as the IP address, of the master earphone 10*a* when powered on. In one embodiment, the earphones may transition roles between master and slave after a certain predetermined time period of operation. In such as embodiment, after the predetermined time period, the slave earphone may assume the role of master and the master earphone may assume the role of slave. In another embodiment, an action by the user of the earphones may trigger the transition. For example, if the user operates a control of one of the earphones to change the source, the actuation of the control by the user may cause the earphones to transition roles. In another embodiment, the earphones may comprise circuitry that monitors in real time battery life or battery voltage of the earphone power source (e.g., battery unit). The earphones 10*a,b* may transition roles based on the remaining real time battery life of the earphones. The code or firmware that allows the earphones to transition roles may be stored in the non-volatile memory units 122 of the earphones and executed by the processor units 114.

In another embodiment, in order to synchronize the earphones, rather than transmitting buffer status packets from the master to the slaves, the earphones would achieve synchronized playback of digital audio by synchronizing their internal clocks and using the synchronized clocks to commence playback at a common scheduled time. If playback is started at the same time the earphones will stay in synchronization because their internal clocks are kept synchronized for the duration of the playback. For the purposes of synchronizing digital audio playback, the clocks should be considered synchronized if the time difference between them is less than 30 ms but preferably less than 500 micro seconds.

The clock synchronization may be achieved by the use of a digital or analog "heartbeat" radio pulse or signal, which is to be broadcast at a frequency higher than the desired time difference between the two clocks (preferably by an order of magnitude)—by an external source or by one of the earphones. In one embodiment the heartbeat signal may be transmitted by the same radio module used to transmit audio data between the earphones, but in other embodiments each earphone may comprise a second radio module—one for the heartbeat signal and one for the digital audio. The radio module for the heartbeat signal preferably is a low-power consumption, low bandwidth radio module, and preferably is short range. In the Wi-Fi embodiment presented earlier, the master earphone 10*a* may send a heartbeat signal to the slave earphone 10*b* on the second radio channel provided by the second radio module, which is different from the Wi-Fi radio channel.

According to various embodiments, therefore, the present invention is directed to an apparatus that comprises first and second acoustic speaker devices (e.g., earphones). The first acoustic speaker device comprises a first acoustic transducer and a first transceiver, wherein the first transceiver receives and transmits wireless signals. The second acoustic speaker device comprises a second acoustic transducer and a second transceiver, wherein the second transceiver receives and transmits wireless signals. The first and second speaker devices communicate wirelessly. The first acoustic speaker device transmits wirelessly to the second acoustic speaker device data that comprises (1) digital audio data and (2) synchronization data. The digital audio data is transmitted via a connection-oriented communication protocol and the synchronization data is transmitted via a connectionless communication protocol.

According to various implementations, the digital audio data sent via the connection-oriented communication protocol comprises TCP/IP protocol data packets. The synchronization data sent via the connection communication protocol may comprise UDP protocol data packets or ICMP messages. The digital audio data transmitted by the first acoustic speaker device to the second acoustic speaker device may comprise received digital audio data that was buffered in a first buffer of the first acoustic audio device and received from a wireless digital audio source via a first wireless communication link. The first acoustic speaker device may wirelessly transmit to the second acoustic speaker device via a second wireless communication link. The first wireless communication link may comprise a Wi-Fi communication link and the second wireless communication link may comprise a Wi-Fi communication link. The synchronization data may comprise audio playback data of the first acoustic speaker device or clock synchronization data (such as a heartbeat signal). The synchronization data may comprise buffer status data of the first buffer of the first acoustic speaker device. The second acoustic speaker device may comprise a second buffer for buffering the digital audio data received from the first acoustic speaker device. The first acoustic speaker device may transmit the synchronization data to the second acoustic speaker device periodically. The second acoustic speaker device may be configured to track time intervals between receipt of the synchronization data from the first acoustic speaker device. The second acoustic speaker device may be configured to compute a status adjustment for the second buffer of the second acoustic speaker device based on the tracked time intervals between receipt of the synchronization data from the first acoustic speaker device. The first and second acoustic speaker device may be configured such that after a period of operation, the second acoustic speaker device transmits wirelessly to the first acoustic speaker device (1) digital audio data via the connection-oriented communication protocol and (2) synchronization data via the connectionless communication protocol.

In other various embodiments, the present invention is directed to a method for synchronizing audio playback by first and second acoustic speaker devices (such as earphones), wherein the first and second acoustic speaker device communicate wirelessly. The method may comprise transmitting wirelessly by the first acoustic speaker device to the second acoustic speaker device data that comprises (1) digital audio data and (2) synchronization data. The digital audio data is transmitted via a connection-oriented communication protocol and the synchronization data is transmitted via a connectionless communication protocol.

According to various implementations, the method may further comprise the steps of: receiving wirelessly by the first acoustic speaker device digital audio data from a wireless digital audio source via a first wireless communication link; and buffering by the first acoustic speaker device the digital audio data from the wireless digital audio source in a first buffer of the first acoustic speaker device. The digital audio data transmitted by the first acoustic speaker device to the second acoustic speaker device may comprise digital audio data buffered in the first buffer of the first acoustic speaker device. The method may also comprise tracking by the second acoustic speaker device time intervals between receipt of the synchronization data from the first acoustic speaker device. The method may also comprise computing by the second acoustic speaker device a status adjustment for the second buffer of the second acoustic speaker device based on the tracked time intervals between receipt of the synchronization data from the first acoustic speaker device. The method may also comprise, after a period of operation, transmitting wirelessly by the second acoustic speaker device to the first acoustic speaker device (1) digital audio data via the connection-oriented communication protocol and (2) synchronization data via the connectionless communication protocol.

The examples presented herein are intended to illustrate potential and specific implementations of the embodiments. It can be appreciated that the examples are intended primarily for purposes of illustration for those skilled in the art. No particular aspect or aspects of the examples is/are intended to limit the scope of the described embodiments. The figures and descriptions of the embodiments have been simplified to illustrate elements that are relevant for a clear understanding of the embodiments, while eliminating, for purposes of clarity, other elements.

In various embodiments disclosed herein, a single component may be replaced by multiple components and multiple components may be replaced by a single component to perform a given function or functions. Except where such substitution would not be operative, such substitution is within the intended scope of the embodiments.

While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. An apparatus comprising:

a first acoustic speaker device comprising a first acoustic transducer and a first transceiver, wherein the first transceiver receives and transmits wireless signals; and a second acoustic speaker device comprising a second acoustic transducer and a second transceiver, wherein the second transceiver receives and transmits wireless signals, wherein the first and second speaker devices communicate wirelessly, and wherein:

the first and second acoustic speaker devices are for playing audio simultaneously; and the first and second acoustic speaker devices maintain synchronicity by:

on an ongoing basis during a timer period that the first and second acoustic speaker device are outputting the audio simultaneously, the first acoustic speaker device transmits wirelessly to the second acoustic speaker device data that comprises (1) digital audio data for the audio to be output simultaneously and (2) synchronization data;

the first acoustic speaker device transmits wirelessly the digital audio data to the second acoustic speaker via a connection-oriented communication protocol;

the first acoustic speaker device transmits wirelessly the synchronization data to the second acoustic speaker via a connectionless communication protocol; and the second acoustic speaker device uses the synchronization data to maintain synchronicity with the first acoustic speaker device.

2. The apparatus of claim 1, wherein the digital audio data sent via the connection-oriented communication protocol comprises TCP/IP protocol data packets.

3. The apparatus of claim 1, wherein the synchronization data sent via the connectionless communication protocol comprises UDP protocol data packets.

4. The apparatus of claim 1 , wherein the synchronization data sent via the connectionless communication protocol comprises ICMP messages.

5. The apparatus of claim 1, wherein:

the digital audio data sent via the connection-oriented communication protocol comprises TCP/IP protocol data packets; and the synchronization data sent via the connectionless communication protocol comprises UDP protocol data packets.

6. The apparatus of claim 1, wherein the first acoustic speaker device comprises a first earphone and the second acoustic speaker device comprises a second earphone.

7. The apparatus of claim 1, wherein the digital audio data transmitted by the first acoustic speaker device to the second acoustic speaker device comprises received digital audio data that was buffered in a first buffer of the first acoustic audio device and received from a wireless digital audio source via a first wireless communication link.

8. The apparatus of claim 7, wherein the first acoustic speaker device wireless transmits to the second acoustic speaker device via a second wireless communication link.

9. The apparatus of claim 8, wherein:

the first wireless communication link comprises a Wi-Fi communication link; and the second wireless communication link comprises a Wi-Fi communication link.

10. The apparatus of claim 1, wherein the synchronization data comprises audio playback data of the first acoustic speaker device.

11. The apparatus of claim 1, wherein the synchronization data comprises clock synchronization data.

12. The apparatus of claim 11, wherein the clock synchronization data comprises a heartbeat signal.

13. The apparatus of claim 7, wherein the synchronization data comprises buffer status data of the first buffer of the first acoustic speaker device.

14. The apparatus of claim 7, wherein the second acoustic speaker device comprises a second buffer for buffering the digital audio data received from the first acoustic speaker device.

15. The apparatus of claim 14, wherein the first acoustic speaker device transmits the synchronization data to the second acoustic speaker device periodically.

16. The apparatus of claim 15, wherein the second acoustic speaker device is configured to track time intervals between receipt of the synchronization data from the first acoustic speaker device.

17. The apparatus of claim 16, wherein the second acoustic speaker device is configured to compute a status adjustment for the second buffer of the second acoustic speaker device based on the tracked time intervals between receipt of the synchronization data from the first acoustic speaker device.

18. The apparatus of claim 1, wherein the first and second acoustic speaker device are configured such that after a period of operation, the second acoustic speaker device transmits wirelessly to the first acoustic speaker device (1) digital audio data via the connection-oriented communication protocol and (2) synchronization data via the connectionless communication protocol.

19. A method for maintaining synchronization of audio playback by first and second acoustic speaker devices, wherein the first and second acoustic speaker device communicate wirelessly, the method comprising:

during a time period that the first and second acoustic speaker devices are outputting the audio simultaneously, transmitting wirelessly by the first acoustic speaker device to the second acoustic speaker device data that comprises (1) digital audio data and (2) synchronization data, wherein:

the first acoustic speaker device transmits wirelessly the digital audio data to the second acoustic speaker via a connection-oriented communication protocol;

the first acoustic speaker device transmits wirelessly the synchronization data to the second acoustic speaker via a connectionless communication protocol; and the second acoustic speaker device uses the synchronization data to maintain synchronicity with the first acoustic speaker device.

20. The method of claim 19, wherein the digital audio data sent via the connection-oriented communication protocol comprises TCP/IP protocol data packets.

21. The method of claim 19, wherein the synchronization data sent via the connectionless communication protocol comprises UDP protocol data packets.

22. The method of claim 19, wherein the synchronization data sent via the connectionless communication protocol comprises ICMP messages.

23. The method of claim 19, wherein:

the digital audio data sent via the connection-oriented communication protocol comprises TCP/IP protocol data packets; and the synchronization data sent via the connectionless communication protocol comprises UDP protocol data packets.

24. The method of claim 19, wherein the first acoustic speaker device comprises a first earphone and the second acoustic speaker device comprises a second earphone.

25. The method of claim 19, further comprising:

receiving wirelessly by the first acoustic speaker device digital audio data from a wireless digital audio source via a first wireless communication link; and buffering by the first acoustic speaker device the digital audio data from the wireless digital audio source in a first buffer of the first acoustic speaker device, wherein the digital audio data transmitted by the first acoustic speaker device to the second acoustic speaker device comprises digital audio data buffered in the first buffer of the first acoustic speaker device.

26. The method of claim 25, wherein the first acoustic speaker device wireless transmits to the second acoustic speaker device via a second wireless communication link.

27. The method of claim 26, wherein:

the first wireless communication link comprises a Wi-Fi communication link; and the second wireless communication link comprises a Wi-Fi communication link.

28. The method of claim 19, wherein the synchronization data comprises audio playback data of the first acoustic speaker device.

29. The method of claim 19, wherein the synchronization data comprises clock synchronization data.

30. The method of claim 29, wherein the clock synchronization data comprises a heartbeat signal.

31. The method of claim 25, wherein the synchronization data comprises buffer status data of the first buffer of the first acoustic speaker device.

32. The method of claim 25, wherein the second acoustic speaker device comprises a second buffer for buffering the digital audio data received from the first acoustic speaker device.

33. The method of claim 32, wherein the first acoustic speaker device transmits the synchronization data to the second acoustic speaker device periodically.

34. The method of claim 33, further comprising tracking by the second acoustic speaker device time intervals between receipt of the synchronization data from the first acoustic speaker device.

35. The method of claim 34, further comprising computing by the second acoustic speaker device a status adjustment for the second buffer of the second acoustic speaker device based on the tracked time intervals between receipt of the synchronization data from the first acoustic speaker device.

36. The method of claim 19, further comprising, after a period of operation, transmitting wirelessly by the second acoustic speaker device to the first acoustic speaker device (1) digital audio data via the connection-oriented communication protocol and (2) synchronization data via the connectionless communication protocol.

* * * * *